United States Patent
Zurecki et al.

(10) Patent No.: US 8,220,370 B2
(45) Date of Patent: Jul. 17, 2012

(54) APPARATUS AND METHOD FOR MACHINING OF HARD METALS WITH REDUCED DETRIMENTAL WHITE LAYER EFFECT

(75) Inventors: Zbigniew Zurecki, Macungie, PA (US); Ranajit Ghosh, Macungie, PA (US); John Herbert Frey, Allentown, PA (US); James Bryan Taylor, Victor, NY (US)

(73) Assignee: Air Products & Chemicals, Inc., Allentown, PA (US)

( * ) Notice: Subject to any disclaimer, the term of this patent is extended or adjusted under 35 U.S.C. 154(b) by 1983 days.

(21) Appl. No.: 10/502,835

(22) PCT Filed: Jan. 21, 2003

(86) PCT No.: PCT/US03/01682
§ 371 (c)(1),
(2), (4) Date: Sep. 17, 2004

(87) PCT Pub. No.: WO03/066916
PCT Pub. Date: Aug. 14, 2003

(65) Prior Publication Data
US 2005/0016337 A1    Jan. 27, 2005

(30) Foreign Application Priority Data
Feb. 4, 2002   (US) .................... 10/066,830

(51) Int. Cl.
*B23B 1/00*     (2006.01)
*B23Q 11/10*    (2006.01)
(52) U.S. Cl. ............... 82/1.11; 82/900; 407/11

(58) Field of Classification Search ............ 82/1.11, 82/133, 134, 900, 173, 123; 407/11
See application file for complete search history.

(56) References Cited

U.S. PATENT DOCUMENTS

| | | | |
|---|---|---|---|
| 2,635,399 | A | 4/1953 | West, Jr. |
| 2,641,047 | A | 6/1953 | Jackman et al. |
| 3,077,802 | A | 2/1963 | Philip |
| 3,433,028 | A | 3/1969 | Klee |
| 3,571,877 | A | 3/1971 | Zerkle |
| 3,650,337 | A | 3/1972 | Andrews et al. |
| 3,696,627 | A | 10/1972 | Longsworth |
| 3,751,780 | A | 8/1973 | Villalobos |

(Continued)

FOREIGN PATENT DOCUMENTS
CN          87102713 A1    9/1987
(Continued)

OTHER PUBLICATIONS

CIRP Annals—Manufacturing Technology, 2008, p. 3, right column.*

(Continued)

*Primary Examiner* — Boyer D Ashley
*Assistant Examiner* — Sara Addisu
(74) *Attorney, Agent, or Firm* — Caesar Rivise Bernstein Cohen & Pokotilow, Ltd

(57) ABSTRACT

An apparatus and a method are disclosed for reducing a thickness of a thermomechanically-affected layer on an as-machined surface of a hard metal workpiece being machined by a hard cutting tool exerting a thermomechanical load on a surface of the workpiece. The method involves reducing the thermomechanical load on the surface of the workpiece, and the apparatus includes a means for reducing the thermomechanical load on the surface of the workpiece.

42 Claims, 5 Drawing Sheets

U.S. PATENT DOCUMENTS

| | | | |
|---|---|---|---|
| 3,889,520 A | 6/1975 | Stoferle et al. | |
| 3,900,975 A | 8/1975 | Lightstone et al. | |
| 3,971,114 A | 7/1976 | Dudley | |
| 3,979,981 A | 9/1976 | Lightstone et al. | |
| 4,083,220 A | 4/1978 | Kobayashi et al. | |
| 4,296,610 A | 10/1981 | Davis | |
| 4,336,689 A | 6/1982 | Davis | |
| 4,404,827 A | 9/1983 | Van den Sype | |
| 4,510,760 A | 4/1985 | Wieland | |
| 4,547,470 A | 10/1985 | Tanase et al. | |
| 4,666,665 A | 5/1987 | Hornsby et al. | |
| 4,715,187 A | 12/1987 | Stearns | |
| 4,716,738 A | 1/1988 | Tatge et al. | |
| 4,788,842 A | 12/1988 | Kopp et al. | |
| 4,829,859 A | 5/1989 | Yankoff | |
| 4,829,869 A | 5/1989 | Katada et al. | |
| 4,844,047 A | 7/1989 | Brehm et al. | |
| 4,848,198 A | 7/1989 | Royal et al. | |
| 5,025,547 A | 6/1991 | Sheu et al. | |
| 5,103,701 A | 4/1992 | Lundin et al. | |
| 5,123,250 A | 6/1992 | Maric | |
| 5,237,894 A | 8/1993 | Lindeke | |
| 5,265,505 A | 11/1993 | Frechette | |
| 5,392,608 A | 2/1995 | Lee | |
| 5,432,132 A | 7/1995 | Dasgupta et al. | |
| 5,449,647 A | 9/1995 | Brandt | |
| 5,477,691 A | 12/1995 | White | |
| 5,509,335 A * | 4/1996 | Emerson | 82/1.11 |
| 5,592,863 A | 1/1997 | Jaskowiak et al. | |
| 5,597,272 A | 1/1997 | Moriguchi | |
| 5,738,281 A | 4/1998 | Zurecki et al. | |
| 5,761,941 A | 6/1998 | Matsui et al. | |
| 5,761,974 A | 6/1998 | Wang et al. | |
| 5,762,381 A | 6/1998 | Vogel et al. | |
| 5,799,553 A | 9/1998 | Billatos | |
| 5,862,833 A | 1/1999 | Perez | |
| 5,878,496 A | 3/1999 | Liu et al. | |
| 5,901,623 A | 5/1999 | Hong | |
| 6,007,909 A * | 12/1999 | Rolander et al. | 428/336 |
| 6,010,283 A | 1/2000 | Henrich et al. | |
| 6,017,172 A | 1/2000 | Ukegawa et al. | |
| 6,053,669 A | 4/2000 | Lagerberg | |
| 6,105,374 A | 8/2000 | Kamody | |
| 6,145,322 A | 11/2000 | Odashima | |
| 6,179,692 B1 | 1/2001 | Hara | |
| 6,200,198 B1 | 3/2001 | Ukai et al. | |
| 6,202,525 B1 | 3/2001 | Hendrickson et al. | |
| 6,305,183 B1 | 10/2001 | Mukai et al. | |
| 6,330,818 B1 | 12/2001 | Jain | |
| 6,332,385 B1 | 12/2001 | Kautto et al. | |
| 6,360,577 B2 | 3/2002 | Austin | |
| 6,454,877 B1 | 9/2002 | Kumar et al. | |
| 6,513,336 B2 | 2/2003 | Zureck et al. | |
| 6,564,682 B1 | 5/2003 | Zurecki et al. | |
| 6,622,570 B1 | 9/2003 | Prevey, III | |
| 6,652,200 B2 | 11/2003 | Kraemer | |
| 6,658,907 B2 | 12/2003 | Inoue et al. | |
| 6,666,061 B2 | 12/2003 | Heimann | |
| 6,675,622 B2 | 1/2004 | Plicht et al. | |
| 6,706,324 B2 * | 3/2004 | Chandrasekar et al. | 427/255.11 |
| 6,815,362 B1 | 11/2004 | Wong et al. | |
| 6,874,344 B1 | 4/2005 | Junius et al. | |
| 2002/0040905 A1 | 4/2002 | Groll | |
| 2002/0150496 A1 * | 10/2002 | Chandrasekar et al. | 419/33 |
| 2002/0174528 A1 | 11/2002 | Prevey, III | |
| 2002/0189413 A1 * | 12/2002 | Zurecki et al. | 82/1.11 |
| 2003/0110781 A1 * | 6/2003 | Zurecki et al. | 62/64 |
| 2003/0145694 A1 | 8/2003 | Zurecki et al. | |
| 2004/0043626 A1 | 3/2004 | Chou San et al. | |
| 2004/0154443 A1 | 8/2004 | Zurecki et al. | |
| 2004/0232258 A1 | 11/2004 | Cerv et al. | |
| 2004/0234350 A1 | 11/2004 | Jager et al. | |
| 2004/0237542 A1 | 12/2004 | Zurecki et al. | |
| 2005/0011201 A1 | 1/2005 | Zurecki et al. | |
| 2005/0016337 A1 | 1/2005 | Zurecki et al. | |
| 2005/0211029 A1 | 9/2005 | Zurecki et al. | |
| 2006/0053987 A1 | 3/2006 | Ghosh et al. | |
| 2007/0084263 A1 | 4/2007 | Zurecki | |
| 2007/0175255 A1 | 8/2007 | Pawelski et al. | |

FOREIGN PATENT DOCUMENTS

| | | |
|---|---|---|
| DE | 196 00 172 C2 | 12/1997 |
| DE | 43 26 517 C2 | 6/1998 |
| DE | 197 30 539 C1 | 4/1999 |
| EP | 0 842 722 A1 | 5/1998 |
| EP | 0 711 663 B1 | 7/1999 |
| EP | 1142669 A2 | 10/2001 |
| EP | 1 580 284 A2 | 9/2005 |
| EP | 0 945 222 B1 | 11/2005 |
| EP | 1 637 257 A1 | 3/2006 |
| FR | 2 724 337 A1 | 3/1996 |
| FR | 2804492 A | 8/2001 |
| FR | 2804492 A1 | 8/2001 |
| JP | 32-8397 | 9/1957 |
| JP | 62-10105 A | 1/1987 |
| JP | 63-62637 B2 | 12/1988 |
| JP | 5-508114 A | 11/1993 |
| JP | 06-031502 A | 2/1994 |
| JP | 6330077 A2 | 11/1994 |
| JP | 9-300172 A | 11/1997 |
| JP | 09-300172 A | 11/1997 |
| JP | 11-156669 A | 6/1999 |
| JP | 11-320328 A | 11/1999 |
| JP | 2000024801 A * | 1/2000 |
| JP | 2000-65291 A | 3/2000 |
| JP | 2000-296438 A | 10/2000 |
| JP | 2000343427 A * | 12/2000 |
| JP | 2002-59336 A | 2/2002 |
| JP | 2002-059336 A | 2/2002 |
| WO | 92/16464 A1 | 10/1992 |
| WO | WO 92/17315 | 10/1992 |
| WO | 97/08486 A1 | 3/1997 |
| WO | 98/10893 A1 | 3/1998 |
| WO | 99/60079 A2 | 11/1999 |
| WO | 02/096598 A1 | 12/2002 |
| WO | 03/002277 A1 | 1/2003 |
| WO | 03/022517 A2 | 3/2003 |
| WO | 03/066916 A2 | 8/2003 |
| WO | 2005/120739 A1 | 12/2005 |

OTHER PUBLICATIONS

U.S. Appl. No. 10/066,830, filed Feb. 4, 2002, Zurecki et al.
Drozda Thomas J., Wick Charles, "Tool and Manufacturing Engineers Handbook," 1983, Society of Manufacturing Engineers, USA XP002264232, p. 1-27 to 1-29, 1-35, and 8-66 to 8-67.
B.J. Griffiths, "White Layer Formation at Machined Surfaces and Their Relationship to White Layer Formations at Worn Surfaces," J. of Tribology, Apr. 1985, vol. 107/165.
W. Konig, et al., "Machining Hard Materials with Geometrically Defined Cutting Edges—Field of Applications and Limitations," Annals of CIRP, 1990,vol. 57, p. 61-64.
Kalpakjian Serope, "Manufacturing Engineering and Technology," 1995, Addison-Wesley Publishing Company, USA XP002264233, p. 607-609, p. 957-960.
H.K. Tonshoff, et al., "Potential and Limitations of Hard Turning," 1st Int. Machining and Grinding Conf., Sep. 12-14, 1995, Dearborn, MI, SME Technical Paper MR95-215.
Y.K. Chou, et al., "Process Effects on White Layer Formation in Hard Turning," Trans. of NAMPRI/SME, vol. XXVI, 1998, p. 117-122.
T.J. Broskea, "PCBN Tool Failure Mode Analysis," Intertech 2000, Vancouver B.C., Canada, Jul. 17-21, 2000.
International Search Report for PCT/US 03/01682 dated Dec. 29, 2003.
Office Action dated Feb. 11, 2003 re U.S. Appl. No. 10/066,830.
"Mechanical Engineering Handbook (2nd Edition)", Editorial Board of Mechanical Engineering Handbook and Electrical Engineering Handbook, p. 1-16, 1-30, 4-3 and 2-41, China Machine Press.
Kazuo Nakayama & Kunio Uehara, "Machining," pp. 60-63, Asakura Publishing Co., Ltd., Mar. 15, 1983.
"Mechanical Engineering Handbook (2nd Edition)", Editorial Board of Mechanical Engineering Handbook and Electrical Engineering Handbook, p. 1-16, 1-30, 4-3 and 2-41, China Machine Press , Jul. 1997.

Majumdar, J.D., et al.; "Laser Surface Alloying—An Advanced Surface Modification Technology"; Department of Metallurgical and Materials Engineering Indian Institute of Technology, Kharagpur-721302, India, I. W. W., Technical University of Clausthal, D-38678 Clausthal Zellerfeld, Germany; pp. 1-11, Jul. 20, 2000.

Chang-Xue (Jack) Feng; "An Experimental Study of the Impact of Turning Parameters on Surface Roughness"; Paper No. 2036; Proceedings of the 2001 Industrial Engineering Research Conference; pp. 1-9.

Mehrotra, P.K., Ph.D.; "Applications of Ceramic Cutting Tools"; Key Engineering Materials; Trans Tech Publications, Switzerland; 1998; vol. 138-140; pp. 1-24.

Dewes, R.C., et al; "The Use of High Speed Machining for the Manufacture of Hardened Steel Dies"; Trans. Namri/Sme; 1996; pp. 21-26.

Huang, J.Y., et al; "Microstructure of Cryogenic Treated M2 Tool Steel"; Materials Science and Engineering A339; Los Alamos, NM; 2003; pp. 241-244.

Ozel, T., et al; "Effects of Cutting Edge Geometry, Workpiece Hardness, Feed Rate and Cutting Speed on Surface Roughness and Forces in Finish Turning of Hardened AISI H13 Steel"; International Journal of Advanced Manufacturing Technology; Piscataway, New Jersey; 2003; pp. 1-33.

Thiele, J.D., et al; "Effect of Cutting Edge Geometry and Workpiece Hardness on Surface Generation in the Finish Hard Turning of AISI 52100 Steel"; Journal of Materials Processing Technology 94; 1999; pp. 216-226.

Zurecki, Z., et al; "Industrial Systems for Cost Effective Machining of Metals Using an Environmentally Friendly Liquid Nitrogen Coolant"; Aerospace Mfg. Tech. Conf; Jun. 2-4, 1998; Paper No. 981,865.

Zurecki, Z., et al; "Dry Machining of Metals with Liquid Nitrogen"; 3rd Intl. Machining & Grinding '99 Conference and Exposition; Oct. 4-7, 1999; Cincinnati, OH; pp. 1-26.

Lin, J., et al; "Estimation of Cutting Temperature in High Speed Machining"; Trans. Of the ASME; vol. 114; Jul. 1992; pp. 290-296.

S545-type milling cutter made by Niagara Cutter (http://www.niagaracutter.com/techinfo), Sep. 2001.

"Heat Transfer in Cutting Inserts", Kabala Andrze, Experimental Stress Analysis 2001.

T. J. Broskea et al., MMS Online (www.mmsonline.com/articles), Jan. 2001.

Kitagawa, T., et al; "Temperature and wear of cutting in high-speed machining of Inconel 718 and Ti6AI-6V-2Sn"; Wear 202; 1997; Elsevier; pp. 142-148.

E. M. Trent and P. K. Wright, "Metal Cutting", 4th Ed., Butterworth, Boston, Oxford, 2000.

ASM Handbook, 9th Ed., vol. 16, "Machining Ceramic Materials," 1995.

Orlowicz, et al., "Effect of Rapid Solidification on Sliding Wear of Iron Castings", Wear 254 (2003), pp. 154-163.

"Machining Data Handbook," 3rd Edition, vol. 1 and 2, Machinability DataCenter, IAMS, Inc. 1980.

"Application of Metal Cutting Theory," F. E. Gorczyca, Industrial Press, New York, 1987.

"Analysis of Material Removal Processes," W. R. DeVries, Springer Texts in Mechanical Eng., Springer-Verlag, 1992.

"Ceramics and Glasses, Engineered Materials Handbook," vol. 4, ASM Int., The Matls Information Soc., '91. 1991.

ASM Specialty Handbook, "Tool Materials," Ed. J. R. Davis, 1998.

"Microstructural Effects in Precision Hard Turning," Y. K. Chou; C. J. Evans, MED-vol. 4, Mfg. Sci. and Engr., ASME 1996.

F. Gunnberg, "Surface Integrity Generated by Hard Turning," Thesis, Dept. of Product Development, Chalmers University of Technology, Goteborg, Sweden, 2003.

"The Lindenfrost phenomenon", F. L. Curzon, Am. J. Phys., 46 (8), Aug. 1978, pp. 825-828.

"A boiling heat transfer paradox", G. G. Lavalle et al., Am. J. Phys., vol. 60, No. 7, Jul. 1992, pp. 593-597.

"Cooling by immersion in liquid nitrogen", T. W. Listerman et al., Am. J. Phys., 54 (6), Jun. '86, pp. 554-558. Jun. 1986.

"An Analytical Method to Determine the Liquid Film Thickness Produced by Gas Atomized Sprays", J. Yang et al., J. of Heat Transfer, Feb. 1996, vol. 118, pp. 255-258.

"Optimizing and Predicting Critical Heat Flux in Spray Cooling of a Square Surface", I. Mudawar and K. A. Estes, J. of Heat Transfer, Aug. 1996, vol. 118, pp. 672-679.

"Film Boiling Under an Impinging Cryogenic Jet", R. F. Barron and R. S. Stanley, Advances in Cryogenic Engineering, vol. 39, Ed. P. Kittel, Plenum Press, New York, 1994, pp. 1769-1777.

"CRC Materials Sci. & Engineering Handbook," 2nd Edition, CRC Press, 1994, Edited by J. F. Shackelford et al.

"Transport Phenomena," R. R. Bird et al., John Wiley & Sons, 1960.

"Numerical and Experimental Simulation for Cutting Temperature Estimation using 3-dimensional Inverse Heat Conduction Technique," F. R. S. Lima, et al. , Jun. 1999.

Biomedical Instrumentation and Tech., "Development of a High-Performance Multiprobe Cryosurgical Device", Chang, et al, 1994.

D'Errico et al. "Performance of Ceramic Cutting Tools in Turning Operations," Industrial Ceramics, vol. 17, 1997, pp. 80-83.

Edwards, Cutting Tools 1993, The Institute of Materials, London, p. 20.

Hong, Shane Y., et al., Micro-temperature Manipulation in Cryogenic Machining of Low Carbon Steel, Elsevier Journal of Materials Processing Technology 116 (2001) pp. 22-30.

* cited by examiner

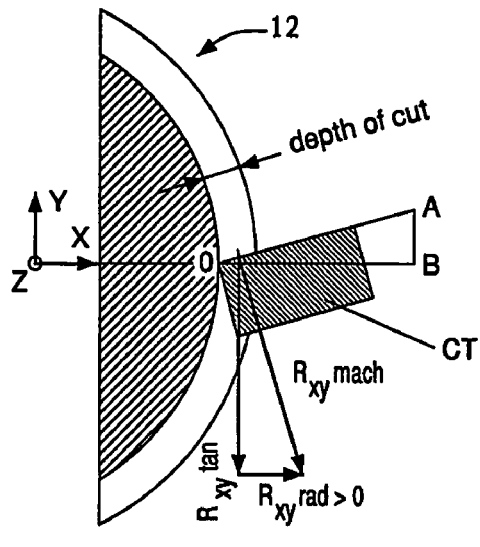
FIG. 4A
PRIOR ART
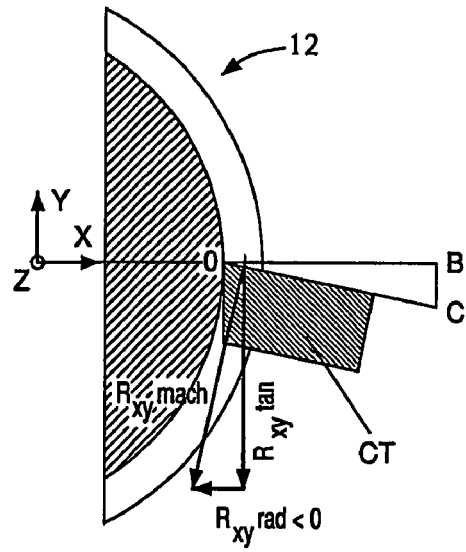
FIG. 4B
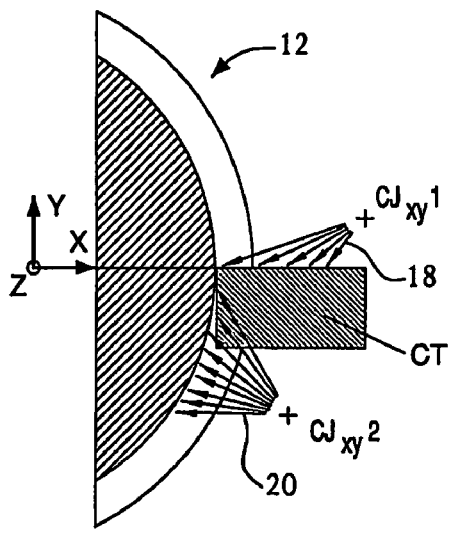
FIG. 4C
<u>X-Y Plane Views</u>
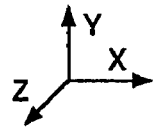

APPARATUS AND METHOD FOR MACHINING OF HARD METALS WITH REDUCED DETRIMENTAL WHITE LAYER EFFECT

BACKGROUND OF THE INVENTION

The present invention relates to the field of machining of hard metallic materials by cutting (e.g., shaping parts by removing excess material in the form of chips) with hard cutting tools, and more particularly to machining methods that reduce the thickness of a thermomechanically-affected layer (e.g., white layer) on as-machined surfaces of hard metal workpieces and/or mitigate the detrimental effects in machined surfaces of hard metal workplaces due to the thermomechanical load of a hard cutting tool machining the workpiece.

Specifically, the invention concerns machining of hard metallic parts, characterized by the surface hardness exceeding 42 Rockwell on Scale C, with hard cutting tools, characterized by the edge hardness exceeding 1500 Vickers. Machining of hard or hardened metallic parts brings about significant cost savings to the manufacturing industries through the reduction of heat-treating and machining steps in the production cycle and minimizing the extent of slow, finish-grinding operations. With the advent of hard, ceramic cutting tools and tool coatings, which include alumina ($Al_2O_3$), cubic boron nitride (CBN) and many other advanced materials, machining of hard metals has become feasible and includes outer diameter (OD) turning, inner diameter turning (boring), grooving, parting, facing, milling, drilling, and numerous other cutting operations.

A significant limitation of the widespread use of hard metal machining is the so-called "white layer" effect, a microscopic alteration of the as-machined surface of a workpiece, which effect is produced in response to an extremely high thermomechanical load exerted at the as-machined surface by the cutting tool. Although not fully understood, the thermomechanically-affected workpiece surface comprising an etching-resistant white layer is undesired because of associated tensile stresses, e.g., reduced fatigue-resistance, lower fracture toughness, and/or reduced wear resistance of parts produced. See, B. J. Griffins, *White Layer Formation at Machined Surfaces and Their Relationship to White Layer Formations at Wom Surfaces, J. of Tribology*, April 1985, Vol. 107/165.

It has been reported that a sharper and/or not worn cutting edge, as well as the conventional flooding of a cutting tool with a water-based, emulsified oil coolant, contribute to the reduction in the detrimental tensile stresses and white layer. W. Konig, M. Klinger, and R. Link, *Machining Hard Materials with Geometrically Defined Cutting Edges—Field of Applications and Limitations, Annals of CIRP* 1990, Vol. 57, pp. 61-64. Hard machining with conventional flood cooling has been reexamined but found to be ineffective. H. K. Tonshoff and H. G. Wobker, *Potential and Limitations of Hard Turning*, $1^{st}$ Int. Machining and Grinding Conf., Sep. 12-14, 1995, Dearborn, Mich., SME Technical Paper MR95-215. Moreover, sharp-finished cutting edges easily fracture in the case of inexpensive, $Al_2O_3$-based tools, leaving expensive CBN tools as the only current option. It has been noted that the use of coolants in hard machining should be avoided since cooling accelerates the edge wear and shortens overall life of CBN tools used for finish-hardturning. T. J. Broskea, *PCBN Tool Failure Mode Analysis*, Intertech 2000, Vancouver B. C., Canada, Jul. 17-21, 2000. Numerous other publications and machining textbooks have indicated that the use of coolants with inexpensive $Al_2O_3$ tools brings about a rapid fracture. Using non-cooled CBN tools (dry turning), the effect of cutting speed on white layer thickness during hardturning of a popular hardened bearing steel 52100 has been examined. Y. K. Chou and C. J. Evans, *Process Effects on White Layer Formation in Hard Turning*, Trans. of NAMRI/SME, Vol. XXVI, 1998, pp. 117-122. Results showed that only relatively low cutting speeds, translating into reduced productivity rates, assure an acceptably thin white layer. Thus, the machining technology of today offers no solution for making hard, white layer-free parts quickly and at reduced costs.

It is desired to have an apparatus and a method which minimize the alteration of workpiece surfaces during hard machining, and more specifically, which eliminate or minimize tensile and/or fluctuating surface stresses and etch-resistant white layer (i.e., the detrimental effects of "white layer").

It is further desired to have an apparatus and method which produce better parts having less of the detrimental effects of a thermomechanically-affected layer (e.g., "white layer") and which do so faster, at lower costs, and with less expensive tools.

BRIEF SUMMARY OF THE INVENTION

Applicants' invention is an apparatus and a method for reducing a thickness of a thermomechanically-affected layer on an as-machined surface of a hard metal workpiece, and an apparatus and a method for mitigating a detrimental effect of a thermomechanical load in a machined surface of a hard metal workpiece. Another aspect of the invention is an apparatus and a method for machining a hard metal workpiece using the aforesaid apparatuses and methods. Other aspects of the invention are the workpieces machined by the apparatus and method for machining.

A first embodiment of the method for reducing a thickness of a thermomechanically-affected layer on an as-machined surface of a hard metal workpiece being machined by a hard cutting tool exerting a thermomechanical load on a surface of the workpiece includes reducing the thermomechanical load.

There are several variations of the first embodiment of that method. In one variation, the hard metal workpiece includes an iron-containing alloy. In another variation, the hard cutting tool is made at least in part of a material selected from a group containing a ceramic compound; a ceramic-ceramic composite; a ceramic-metal composite; a diamond-like, metal-free material; an alumina-based ceramic; a cubic boron nitride-based ceramic material; a tungsten carbide-based material; and a cermet-type material.

In another variation, the cutting tool initially has a first temperature prior to contacting the surface of the workpiece, and the thermomechanical load is reduced by cooling the cutting tool to a second temperature lower than the first temperature before the cutting tool contacts the surface of the workpiece or while the workpiece is being machined. In a variant of that variation, the cutting tool is cooled by an external cooling means. In one variant of that variant, the cooling means includes at least one cryogenic fluid. In another variant, the cooling means includes at least one inert, water-free coolant. In yet another variant, the cutting tool has a hardness and a resistance to cracking, and cooling the cutting tool with the cooling means results in an increase in the hardness or an increase in the resistance to cracking.

In another variation of the method, at least a portion of the thermomechanical load is a component of a cutting force, the component being applied in a direction normal to the surface of the workpiece, and the thermomechanical load is reduced by reducing the component of the cutting force. There are several variants of this variation. In one variant, the cutting tool has an inclination angle, and the component of the cutting force is reduced by making the inclination angle more positive. (The phrase "making the inclination angle more positive" is defined and discussed in the Detailed Description of the invention section below.) In another variant, the cutting tool has a rake angle, and the component of the cutting force is reduced by making the rake angle more positive.

A second embodiment of the method for reducing a thickness of a thermomechanically-affected layer on an as-machined surface of a hard metal workpiece being machined by a hard cutting tool includes multiple steps. In this embodiment, the cutting tool initially has a first temperature prior to contacting the surface of the workpiece and exerts a thermomechanical load on a surface of the workpiece, at least a portion of the thermomechanical load being a component of a cutting force, the component being applied in a direction normal to the surface of the workpiece. The first step of the method is to cool the cutting tool to a second temperature lower than the first temperature before the cutting tool contacts the surface of the workpiece or while the workpiece is being machined. The second step is to reduce the component of the cutting force.

A first embodiment of the method for mitigating a detrimental effect of a thermomechanical load in a machined surface of a hard metal workpiece, the thermomechanical load being exerted on a surface of the workpiece by a hard cutting tool machining the workpiece, thereby forming the machined surface, includes cooling the machined surface by a cooling means having an initial temperature in a range of about −250° C. to about +25° C.

There are several variations of the first embodiment of that method. In one variation, the cooling means includes at least one inert, water-free coolant. In another variation, the cooling means includes at least one stream containing a cryogenic fluid or at least one ice particle having a temperature less than about −75° C. In another variation, the hard metal workpiece includes an iron-containing alloy. In another variation, the hard cutting tool is made at least in part of a material selected from a group containing a ceramic compound; a ceramic-ceramic composite; a ceramic-metal composite; a diamond-like, metal-free material; an alumina-based ceramic; a cubic boron nitride-based ceramic material; a tungsten carbide-based material; and a cermet-type material.

A second embodiment of the method for mitigating the detrimental effect is similar to the first embodiment, but also Includes cooling the cutting tool simultaneously by the cooling means.

In a third embodiment of the method for mitigating the detrimental effect, which is similar to the first embodiment, at least a portion of the thermomechanical load is a component of a cutting force, the component being applied in a direction normal to the surface of the workpiece. The method in this third embodiment includes reducing the component of the cutting force. In a variation of this embodiment, wherein the cutting tool has an inclination angle, the component of the cutting force is reduced by making the inclination angle more positive and the cooling means includes at least one stream containing a cryogenic fluid or at least one ice particle having a temperature less than about −75° C.

A fourth embodiment of the method for mitigating the detrimental effect is similar to the third embodiment, but includes cooling the cutting tool simultaneously by the cooling means. In a variation of the fourth embodiment, wherein the cutting tool has an inclination angle, the component of the cutting force is reduced by making the inclination angle more positive and the cooling means includes at least one stream containing a cryogenic fluid with at least one ice particle having a temperature less than about −75° C.

Another aspect of the invention is a method for machining a hard metal workpiece. There are several embodiments of this method.

A first embodiment of the method for machining a hard metal workpiece, whereby a thickness of a thermomechanically-affected layer on an as-machined surface of the workpiece is reduced, the workpiece being machined with a hard cutting tool initially having a first temperature prior to contacting the surface of the workpiece, the hard cutting tool exerting a thermomechanical load on a surface of the workpiece, includes cooling the cutting tool to a second temperature lower than the first temperature before the cutting tool contacts the surface of the workpiece or while the workpiece is being machined.

A second embodiment of the method for machining a hard metal workpiece, whereby a detrimental effect of a thermomechanical load is mitigated in a machined surface of the workpiece, the thermomechanical load being exerted on a surface of the workpiece by a hard cutting tool forming the machined surface of the workplace, includes cooling the machined surface by a cooling means having an initial temperature in a range of about −250° C. to about +25° C.

A third embodiment of the method for machining a hard metal workpiece, whereby a thickness of a thermomechanically-affected layer on an as-machined surface of the workpiece is reduced, the workpiece being machined with a hard cutting tool, the hard cutting tool exerting a thermomechanical load on a surface of the workpiece, at least a portion of the thermomechanical load being a component of a cutting force, the component being applied in a direction normal to the surface of the workpiece, includes reducing the component of the cutting force.

In a fourth embodiment of the method for machining, which is similar to the first embodiment, at least a portion of thermomechanical load is a component of a cutting force, the component being applied in a direction normal to the surface of the workpiece. The fourth embodiment includes reducing the component of the cutting force.

A fifth embodiment of the method for machining is similar to the second embodiment, but includes cooling the cutting tool simultaneously by the cooling means.

In a sixth embodiment of the method for machining, which is similar to the second embodiment, at least a portion of the thermomechanical load is a component of the cutting force, the component being applied in a direction normal to the surface of the workpiece. The sixth embodiment Includes reducing the component of the cutting force.

A seventh embodiment of the method for machining is similar to the sixth embodiment, but includes cooling the cutting tool simultaneously by the cooling means.

Another aspect of the invention is a workpiece machined by a method for machining as in any of the aforesaid embodiments and characterized by an improved surface or an improved property.

A first embodiment of the apparatus for reducing a thickness of a thermomechanically-affected layer on an as-machined surface of a hard metal workpiece being machined by a hard cutting tool exerting a thermomechanical load on a surface of the workpiece, includes a means for reducing the thermomechanical load.

There are several variations of the first embodiment of that apparatus. In one variation, the hard metal workpiece includes an iron-containing alloy. In another variation, the hard cutting tool is made at least in part of a material selected from a group containing a ceramic compound; a ceramic-ceramic composite; a ceramic-metal composite; a diamond-like, metal-free material; an alumina-based ceramic; a cubic boron nitride-based ceramic material; a tungsten carbide-based material; and a cermet-type material.

A second embodiment of the apparatus for reducing a thickness of a thermomechanically-affected layer on an as-machined surface of a hard metal workpiece being machined by a hard cutting tool initially having a first temperature prior to contacting the surface of the workpiece, the hard cutting tool exerting a thermomechanical load on a surface of the workpiece, at least a portion of the thermomechanical load being a component of a cutting force, the component being applied in a direction normal to the surface of the workpiece, includes: a means for cooling the cutting tool to a second temperature lower than the first temperature before the cutting tool contacts the surface of the workpiece or while the workpiece is being machined; and a means for reducing the component of the cutting force.

A first embodiment of the apparatus for mitigating a detrimental effect of a thermomechanical load in a machined surface of a hard metal workpiece, the thermomechanical load being exerted on a surface of the workpiece by a hard cutting tool machining the workpiece, thereby forming the machined surface, includes a means for cooling the machined surface by at least one stream of a coolant having an initial temperature In a range of about −250° C. to about +25° C. In one variation of this embodiment, the stream contains at least one inert, water-free coolant. In another variation, the at least one stream contains a cryogenic fluid or at least one ice particle having a temperature less than about −75° C.

A second embodiment of the apparatus for mitigating a detrimental effect of a thermomechanical load in the machined surface of a hard metal workpiece, the thermomechanical load being exerted on a surface of the workpiece by a hard cutting tool machining the workpiece, thereby forming the machined surface, wherein at least a portion of the thermomechanical load Is a component of the cutting force, the component being applied in a direction normal to the surface of the workpiece, includes: a means for cooling the machined surface by at least one stream containing at least one inert, water-free coolant having an initial temperature in a range of about −250° C. to about +25° C.; a means for cooling the cutting tool simultaneously by at least another stream containing at least one inert, water-free coolant; and a means for reducing the component of the cutting force.

Another aspect of the invention is an apparatus for machining a hard metal workpiece. There are several embodiments of the apparatus for machining.

A first embodiment of the apparatus for machining a hard metal workpiece, whereby a thickness of a thermomechanically-affected layer on an as-machined surface of the workpiece is reduced, the workpiece being machined by a hard cutting tool initially having a first temperature prior to contacting the surface of the workpiece, the hard cutting tool exerting a thermomechanical load on a surface of the workpiece, includes a means for cooling the cutting tool to a second temperature lower than the first temperature before the cutting tool contacts the surface of the workpiece or while the workpiece Is being machined.

A second embodiment of the apparatus for machining a hard metal workpiece, whereby a detrimental effect of a thermomechanical load is mitigated in a machined surface of the workpiece, the thermomechanical load being exerted on a surface of the workpiece by a hard cutting tool forming the machined surface of the workpiece, includes a means for cooling the machined surface by a stream of a fluid having an initial temperature in a range of about −250° C. to about +25° C.

A third embodiment of the apparatus for machining a hard metal workpiece, whereby a thickness of a thermomechanically-affected layer on an as-machined surface of the workpiece is reduced, the workpiece being machined by a hard cutting tool exerting a thermomechanical load on a surface of the workpiece, at least a portion of the thermomechanical load being a component of a cutting force, the component being applied In a direction normal to the surface of the workpiece, includes a means for reducing the component of the cutting force.

In a fourth embodiment, which is similar to the first embodiment, at least a portion of the thermomechanical load is a component of a cutting force, the component being applied In a direction normal to the surface of the workpiece. The fourth embodiment includes a means for reducing the component of the cutting force.

The fifth embodiment of the apparatus for machining is similar to the second embodiment, but includes a means for simultaneously cooling the cutting tool with at least one other stream of the fluid, the means for cooling being means for spraying the streams of the fluid.

A sixth embodiment of the apparatus for machining Is similar to the third embodiment, but includes a means for spraying the machined surface with at least one stream of a fluid having an initial temperature in a range of about −250° C. to about +25° C.

The seventh embodiment of the apparatus for machining Is similar to the sixth embodiment, but includes a means for spraying at least one other stream of the fluid simultaneously on the cutting tool.

Another aspect of the invention is a workpiece machined by an apparatus for machining as in any of the aforesaid embodiments and characterized by an improved surface or an improved property.

BRIEF DESCRIPTION OF THE DRAWINGS

The invention will be described by way of example with reference to the accompanying drawings, in which:

FIG. 4A is a schematic diagram Illustrating a conventional method of hardturning where the inclination angle A-O-B is negative;

FIG. 4B is a schematic diagram illustrating an embodiment of the present invention wherein the inclination angle is increased from the negative value shown in FIG. 4A to a positive value B-O-C shown in FIG. 4B; and FIG. 4C Is a schematic diagram illustrating another embodiment of the present invention.

DETAILED DESCRIPTION OF THE INVENTION

Figure 1A:
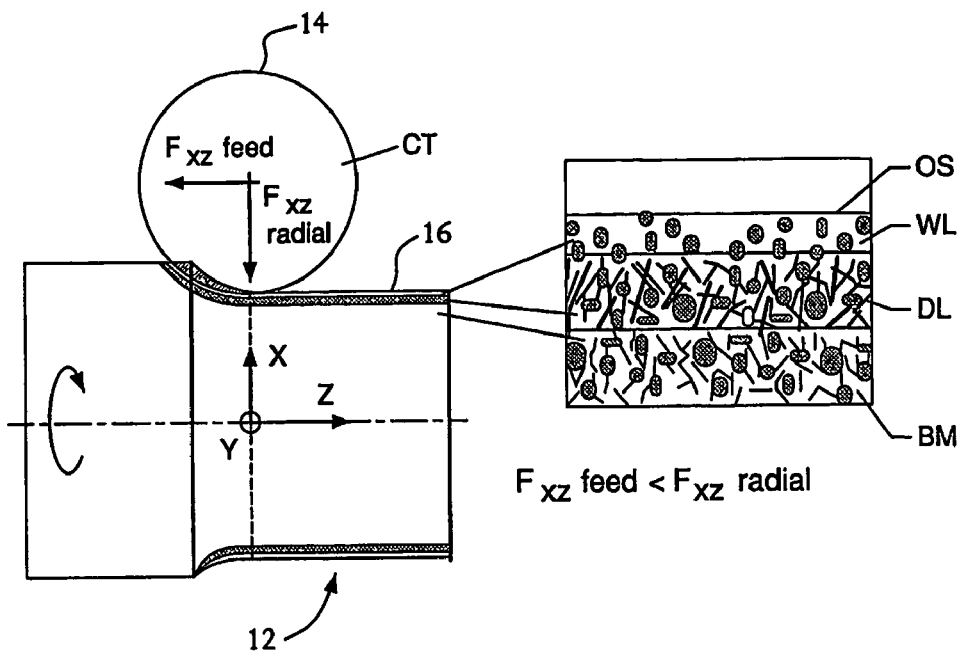
FIG. 1A is a schematic diagram illustrating an OD-hard-turning operation using a solid barstock and a round cutting tool, plus a schematic representation of a detail illustrating a cross-sectional view of a typical subsurface microstructure of an as-machined workpiece.

The present invention involves machining hard metallic workpieces with hard cutting tools using a method which reduces the thickness of, or eliminates, thermomechanically-affected layers, including but not limited to white layer, and allows cutting at higher speeds without an excessive white layer using CBN tool materials, as well as less expensive $Al_2O_3$, carbide, cermet, or other hard tool materials. As used hereinafter, the term "white layer" refers to all types of "thermomechanically-affected layers," including but not limited to those associated with surface tensile stresses (e.g., reduced fatigue-resistance, lower fracture toughness, and/or reduced wear resistance).

According to the present invention, the thermomechanical load exerted by the cutting tool at the machined surface is reduced using one or a combination of the three techniques (A, B, C) discussed below.

A. Cooling cutting tool with a precisely aimed jet or spray of inert, water-free coolant, so that the heat transferred from the hot tool interface to the workpiece Is reduced and, most preferably, the tool becomes a heat sink for the workpiece surface.

The temperature of the tool cooling jet may vary between +25° C. and −250° C., with the lower, cryogenic jet temperatures preferred. The tool cooled with such a jet makes the surface of a machined part colder. In addition, as observed during hard machining tests, in contrast to conventional machining technology teachings, the use of inert and water-free cooling jets enhances the life of $Al_2O_3$, CBN and other, hard cutting tools and, consequently, allows the use of sharper cutting edges which generate lower cutting forces and thinner white layers.

B. Cooling the as-formed or as-machined workpiece surface with the same type of direct impinging cooling jet or spray as in technique A.

Based on observations, it appears that cooling of the as-machined workpiece surface reduces the depth of heat penetration into machined material and, consequently, the extent of undesired material transformations. The surface-cooling jet of technique B may be separate from the tool-cooling jet of technique A; or just a single jet can be aimed in such a way that it cools both the tool and the surface simultaneously. Persons skilled in the art will recognize that multiple cooling jets or sprays of technique A and technique B could be used according to the present invention.

C. Reducing the cutting force component in the direction normal to the as-machined workpiece surface.

As observed during tests, the cutting force component normal to the as-machined workpiece surface appears to be a significant source of heat flux entering the surface and generating white layer. In the case of the most frequently practiced OD-hardturning operations, where the normal force is the radial force, a more positive tool inclination angle results in a reduced thermomechanical load entering the surface. In the case of orthogonal cutting, where the normal force is the feed force, a more positive rake angle will be more important. In the most generic cutting case, both the inclination angle and the rake angle are made more positive than the conventional, negative values that are used in current hard machining operations. Since the life of hard cutting tools scales inversely with the positive inclination and rake angle, the increase in the value of these angles is most advantageous if practiced in combination with technique A, which also enhances tool life during hard machining.

FIG. 1A is a schematic diagram of an OD-hardturning operation involving a solid barstock as the workpiece 12 and a round cutting tool 14 (with a cutting insert marked as CT) viewed from the topside of the tool rake surface. This view is referred to as the X-Z plane view. The X-Z projection of the major cutting forces that have to be applied to the workpiece via the cutting tool is denoted as $F_{xz}$feed or feed force, and $F_{xz}$radial or radial force, where the feed force is less than the radial force. The location of the thermomechanically-affected layers 16 on the as-machined surface of the workpiece is illustrated In FIG. 1A. The detail on the right of the figure shows a cross-sectional view of the typical subsurface microstructure of the as-machined workpiece that can be observed under a scanning electron microscope (SEM) using magnifications ranging from 3,000 to 12,000 times. The following designations are used: OS—outer surface that was in direct contact with the cutting tool during hardturning, WL—white layer, DL—dark layer, and BM—base metal representing the parent or unaffected structure of the barstock.

Based on SEM examinations carried out on a popular bearing steel grade, AISI 52100 (1 wt % C and 1.5 wt % Cr), hardened to 61 Rockwell on scale C and hard machined, the white layer (WL) is a thin band of poorly etching material with broadly dispersed, spherical carbides. The underlying dark layer (DL) is thicker than the white layer, and contains more and bigger carbide particles, as well as microfeatures suggesting martensitic needles and latches. The thermomechanically-affected layer Includes both the white layer (WL) and the dark layer (DL) but also extends even deeper into the base metal and cannot be measured using simple microscopic methods. Consequently, the evaluation of the thickness of a thermomechanically-affected layer is usually based on (1) a microscopic measurement of the well contrasting white layer (WL), combined with (2) additional measurements of the mechanical properties of the material below the as-machined surface, e.g., residual stress and microhardness measurements.

Figure 1B:
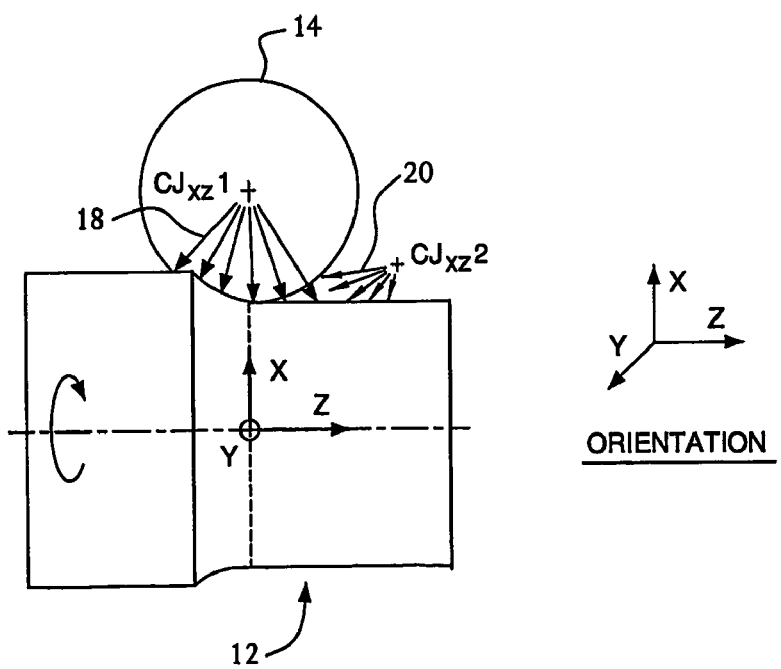
FIG. 1B is a schematic diagram Illustrating an embodiment of the present invention used with an OD-hardturning operation similar to that shown In FIG. 1A.

FIG. 1B shows the same X-Z view of the cutting tool 14 and the workpiece 12 (barstock), but does not include the cross-sectional details of the subsurface microstructure as in FIG. 1A. Points $CJ_{xz}1$ and $CJ_{xz}2$ are X-Z plane projections of the preferred locations of cold jet-discharging orifices (not shown) that aim the cooling jets (18, 20) at the rake of the cutting tool, at the as-machined surface of the workpiece and, optionally, into the clearance gap between the cutting tool and the workpiece surface, just below the rake surface and the cutting tool-workpiece contact area. Thus, the cold jet impact is limited to the cutting tool and the as-machined workpiece surface area. It is important not to cool the barstock upstream of the cutting tool, since such cooling increases the mechanical energy required for cutting, i.e., cancels the cooling effect and simultaneously shortens the life of the cutting tool. As shown in FIG. 1B, the $CJ_{xz}1$ jet may be positioned higher or lower, above the rake along the Y-axis, and may impact only the rake surface along the contact length. This represents technique A, discussed earlier. Alternatively, the $CJ_{xz}1$ jet may spray both the rake and the as-machined surface downstream of the cutting tool. This alternate approach combines techniques A and B. The $CJ_{xz}2$ jet may be positioned behind or below the cutting tool, along the Y and the Z axes, in order to work according to technique B. The $CJ_{xz}2$ jet can be eliminated as well if the spray 18 from the $CJ_{xz}1$ jet is sufficiently effective in cooling the machined surface. The results of comparative tests carried out to evaluate the effectiveness of techniques A, B, and C are summarized in Table 1, which details the conditions of the tests.

TABLE 1

| Cutting tool system | Cutting Insert: | CBN, a "low-content PCBN" type | Al$_2$O$_3$-based ceramic type, Al$_2$O$_3$-TICN composition |
|---|---|---|---|
| | Insert designation and description: | BNC80, 4NC-CNMA432, 4 cutting edges, PVD-TIN coated | KY4400, CNGA432, 4 cutting edges, PVD-TIN coated |
| | Supplier/toolmaker: | Sumitomo | Kennametal |
| | Edge chamfer angle, measured: | 25° +/− 3° | 25° +/− 3° |
| | Chamfer width, measured: | 0.00325 inches | 0.00425 inches |
| | Toolholder for cutting insert: | MCLNL-164C, Kennametal | MCLNL-164C, Kennametal |
| | Toolholder's angles: | −5° rake angle and −5° inclination angle | −5° rake angle and −5° inclination angle |
| Cutting parameters | Cutting speed in ft/minute: | 400 and 700 | 400 and 700 |
| | Feedrate in inches/revolution, see: comment (1) below | 0.004 | 0.004 |
| | Depth of cut in inches: | 0.015 | 0.015 |
| | Cutting (feed) direction: | Radial (along X-axis), facing | Radial (along X-axis), facing |
| Cooling conditions | Two cooling methods: | (1) Dry (no cooling), and (2) CJ$_{xz}$ 1 jet aimed at the tool rake and at as-machined surface according to techniques A and B | (1) Dry (no cooling), and (2) CJ$_{xz}$ 1 jet aimed at the tool rake and at as-machined surface according to techniques A and B |
| | Cooling medium for case (2), above: | Cryogenic liquid nitrogen jet impacting rake and as-machined surface in form of a 2-phase fluid which is boiling at −197° C. | Cryogenic liquid nitrogen jet impacting rake and as-machined surface in form of a 2-phase fluid which is boiling at −197° C. |
| Workpiece material | AISI 52100 bearing steel, 1.0 wt % carbon, 1.5 wt % chromium | Oil quenched and low-tempered to 61 HRC +/− 1 HRC | Oil quenched and low-tempered to 61 HRC +/− 1 HRC |
| White layer examination conditions | Workpiece material volume removed by a new cutting edge before taking as-machined workpiece surface samples for examination of white layer, see comment (2) below | 1.06 cubic inches | 1.06 cubic inches |
| | Number of interruptions during workpiece material cutting prior to white layer examination: | 8 | 8 |
| | Surface roughness range of as-machined workpiece surface samples transferred for white layer evaluations | Ra = 15-20 microinches/inch | Ra = 15-30 microinches/inch |
| | Residual stress measurement method: | Incremental hole drilling with 1 mm diameter drill, extensometer rosette | Incremental hole drilling with 1 mm diameter drill, extensometer rosette |
| | Direction of metallographic cut for image evaluation and microhardness measurements: | Perpendicular to as-machined workpiece surface and in the radial direction (along X-axis) | Perpendicular to as-machined workpiece surface and in the radial direction (along X-axis) |
| | Microhardness measurement method - Knoop, 100 G load applied for 15 seconds | Profiling hardness as a function of depth under as-machined workpiece surface with blade-shaped indenter | Profiling hardness as a function of depth under as-machined workpiece surface with blade-shaped indenter |
| | Etchant used for developing white layer contrast on cross-sectional metallographic | Nital - 5% HNO$_3$ in ethanol applied to sample surface for 10 seconds | Nital - 5% HNO$_3$ in ethanol applied to sample surface for 10 seconds |

TABLE 1-continued

| Cutting tool system | Cutting Insert: | CBN, a "low-content PCBN" type | $Al_2O_3$-based ceramic type, $Al_2O_3$-TICN composition |
|---|---|---|---|
| | samples of as-machined workpiece surface: | | |

Comments
(1) Since the feedrate was larger than the chamfer width of the CBN tool used, the effective rake angle of the CBN tool was larger, i.e. more positive or sharper, than the effective rake angle of the $Al_2O_3$ tool. Consequently, the CBN insert used generated lower nomal force during face cutting than the $Al_2O_3$ insert which, according to technique C results in a lower thermomechanical load at as-machined work surface, i.e. a thinner thermomechanically-affected surface including white layer. The $2^{nd}$ factor influencing white layer is the temperature at the tool-work contact area. Thermal conductivity of the low-PCBN tool is somewhat higher than that of the $Al_2O_3$—TiCN tool which means the contact area is cooler in the former case.
(2) The procedure of removing initial material volume with cutting edge prior to taking as-machined workpiece surface samples replicates typical industrial hard machining conditions where the majority of part is produced using somewhat worn cutting edges.

Figure 2:
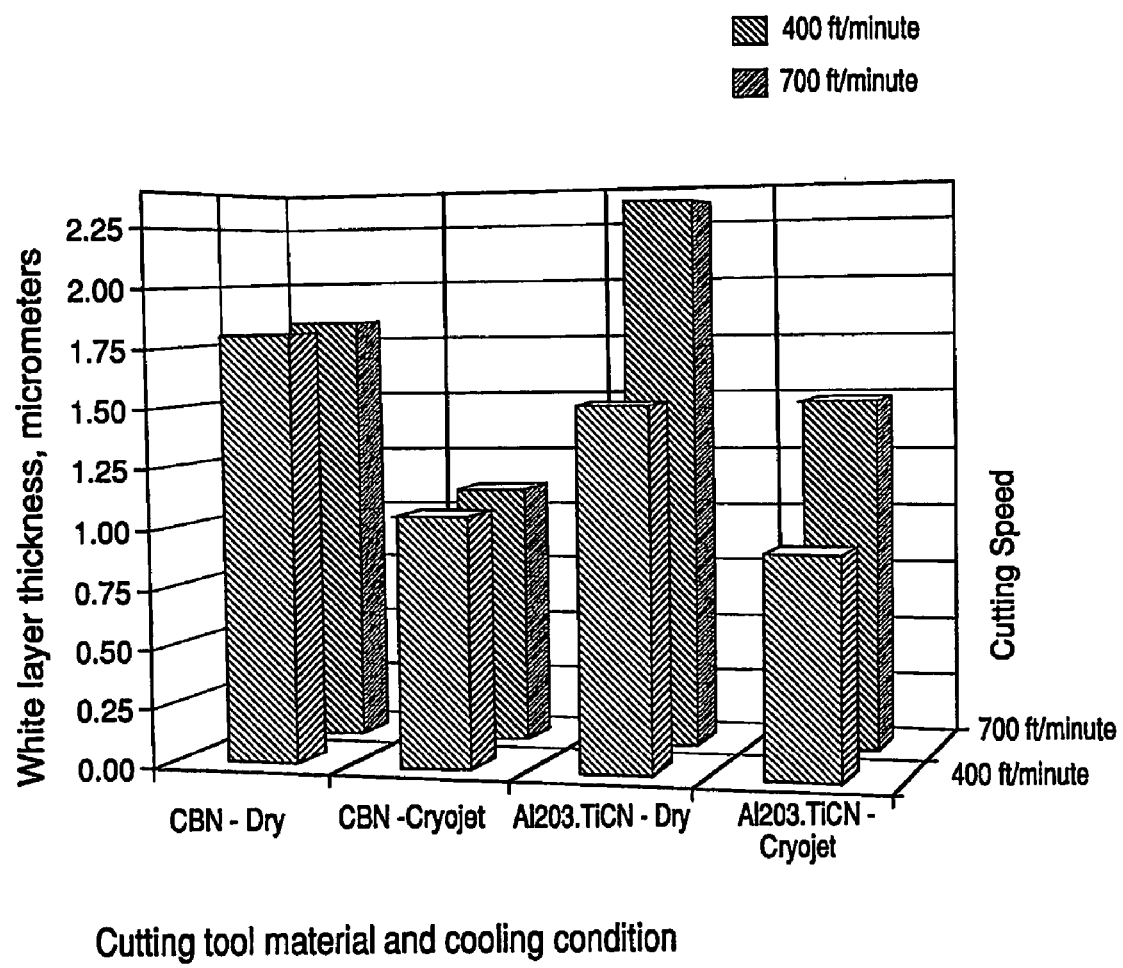
FIG. 2 is a graph showing the measurement of white layer thickness for eight test conditions using different cutting speeds, cutting tool materials and cooling conditions.

FIG. 2 shows the results of SEM measurements of the white layer thickness for eight (8) test conditions. The results show that the sharper and more conductive CBN tool tends to produce a thinner white layer than that produced by the $Al_2O_3$ tool. The reduction of the normal component of the cutting force coming with the sharper tools, and the reduction of tool temperature with more conductive tool materials, are consistent with our techniques A and C. However, the most significant factor in reducing white layer thickness was the cooling jet applied according to techniques A and B, which was capable of reducing the white layer by about 40% regardless of the tool and cutting speed used. The most Important and surprising finding is that the white layer produced with the jet-cooled $Al_2O_3$ tool is significantly thinner than the white layer produced by the CBN tool operated the conventional way (i.e., dry). Moreover, the white layer produced with the $Al_2O_3$ tool at 700 feet/minute is thinner than the white layer produced with the dry CBN tool at 400 fuminute. Thus, the present invention enables hard machining operators to produce better parts faster and at lower tooling cost.

Figure 3A:
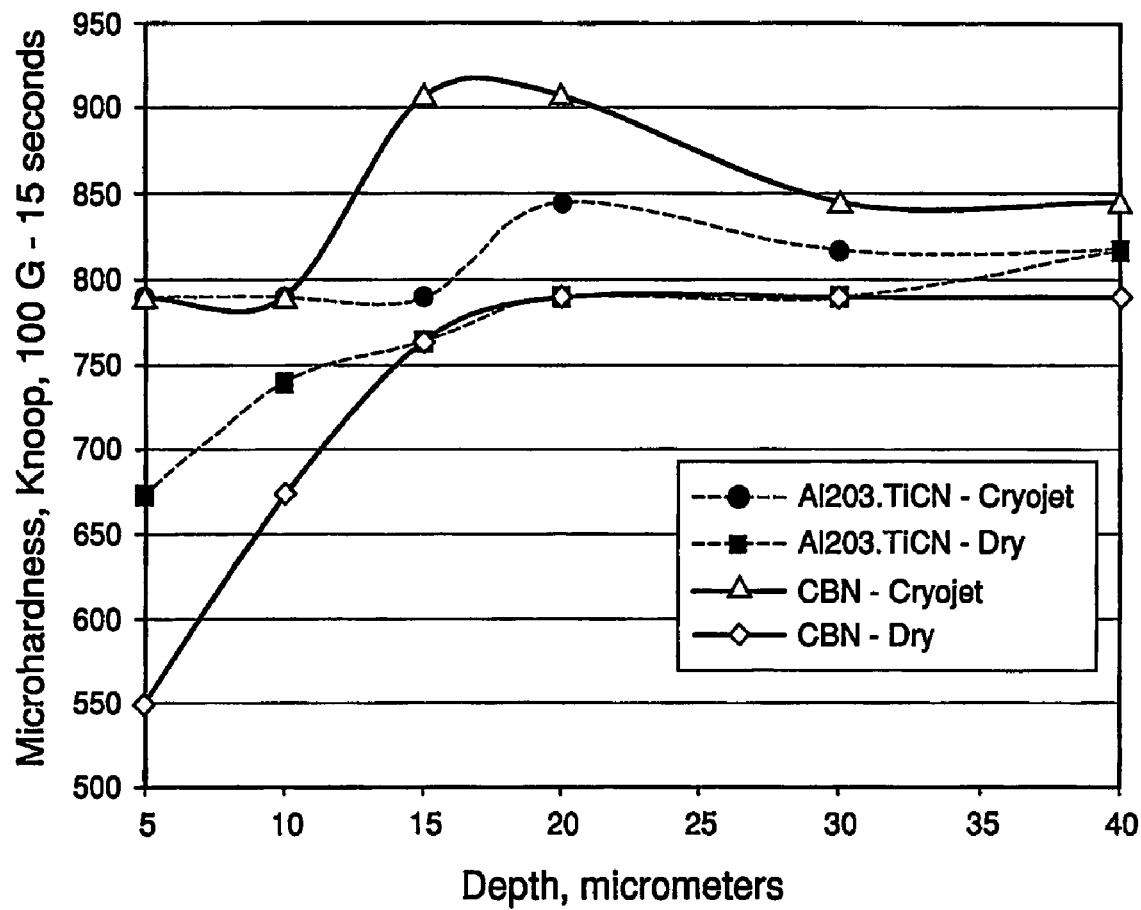
FIG. 3A is a graph showing the change of subsurface hardness as a result of hardturning with different cutting tool materials and cooling conditions at a cutting speed of 700 feet per minute.

FIG. 3A shows the change of subsurface hardness as a result of hardturning with the CBN and $Al_2O_3$ tools at the cutting speed of 700 feet/minute. Undesired softening of workpiece material observed within the first 15 micrometers under the as-machined surface after the conventional dry hardturning is prevented when the cryogenic cooling jet is used according to techniques A and B of the Invention.

Figure 3B:
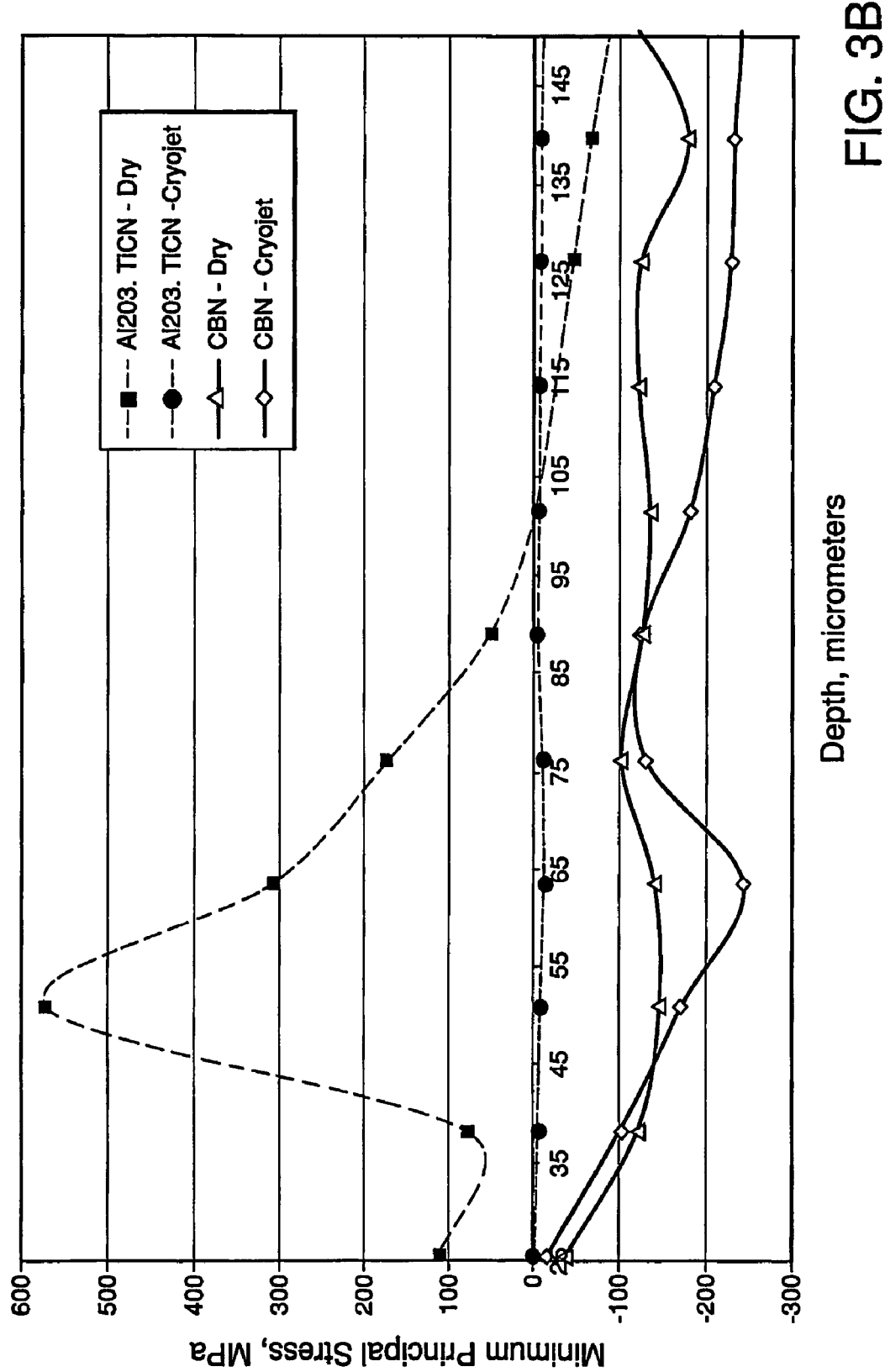
FIG. 3B Is a graph showing the results of residual stress measurements on four types of samples as shown in FIG. 3A.

FIG. 3B plots results of residual stress measurements on the same four types of samples as in FIG. 3A. In the case of $Al_2O_3$, the cryojet cooling eliminates a steep tensile stress resulting from the conventional dry hardturning. In the case of CBN, the cryojet makes the subsurface stress slightly more compressive and, just as in the case of $Al_2O_3$, flattens the fluctuation of stress with depth. Both FIGS. 3A and 3B show that the techniques A and B of the invention bring an unexpected improvement in the mechanical properties of a hard machined surface.

As FIG. 1B presented the X-Z plane view of OD-hardturning, FIGS. 4A, 4B and 4C present the same operation but in the X-Y plane showing a section of the face of the barstock or workpiece 12 and the side of the cutting insert (CT). FIG. 4A shows the conventional method of hardturning where the Inclination angle A-O-B is negative. The X-Y projection of the work-material reaction force that resists machining operation, $R_{xy}$mach, can be presented with some degree of simplification as a sum of two forces projected on the same plane X-Y: tangential reaction cutting force, $R_{xy}$tan, and radial reaction force, $R_{xy}$rad. The radial reaction force is larger than zero, usually larger than the tangential or the feed force (extending along the Z-axis), and in some hardturning cases larger than the tangential and feed forces combined. To balance the radial reaction force, the radial force applied via the cutting tool to the workplace surface, $F_{xz}$rad, must be equally large, which leads to a high thermomechanical load being applied by the cutting tool to the workpiece surface and contributes to the formation of thick white layers.

FIG. 4B presents a modification of the conventional cutting geometry (in FIG. 4A) as the inclination angle, B-O-C, is increased from the initial negative value (represented by A-O-B) in FIG. 4A to a new positive value, which results in reversing the direction of the radial reaction force, $R_{xy}$rad. In effect, the increased or more positive inclination angle reduces the required radial force of the cutting tool to zero or below zero, resulting in a reduction of the thermomechanically-affected layer at the workpiece surface. This modification of the cutting geometry represents technique C of the present invention. This technique may be extended to hard facing and hard orthogonal cutting operations where, if effective rake angles are made more positive than the conventionally used negative angles, then the thermomechanical load at the workpiece surface is reduced, and the thermomechanically-affected layer is thinner.

The increased inclination and/or rake angles may produce tensile stresses around the cutting edges of typically brittle tools used in hard machining. Such tensile stresses may lead to premature tool failures in the case of the conventional technology that teaches dry cutting conditions. As observed, the failures are less frequent and tool life is extended when at least one cooling jet or spray is aimed at the rake of the cutting tool during hard machining, and the cooling fluid used is inert, water-free, and preferably cryogenic. (The term "inert" means that the cooling fluid does not react with the hard metal and does not degrade the mechanical properties of the hard metal or the hard cutting tool.)

FIG. 4C shows the X-Y plane projection of two cooling Jets, $CJ_{xy}1$ and $CJ_{xy}2$, corresponding to the jets shown in FIG. 1B in the X-Z plane view. The application of technique C is most advantageous from the production and cost standpoint, when CJ1 or, alternatively, CJ1 and CJ2 are spraying coolant during the hard cutting, as shown In FIG. 4C.

The present invention minimizes detrimental white layer and other thermomechanically-affected layers In an as-machined workpiece surface by reducing the thermomechanical load exerted by the cutting tool on the workpiece material surface during hard machining. As discussed above, the present invention includes three techniques (A, B, C) which may be used separately or in combination (AB, AC, BC, ABC).

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A method for reducing a thickness of a thermomechanically-affected layer, including a white layer (WL) and a dark layer (DL), on and under an as-machined surface of a hard metal workpiece, having a surface hardness exceeding 42 Rockwell on Scale C, being machined by a hard cutting tool, having an edge hardness exceeding 1500 Vickers, the hard cutting tool exerting a thermomechanical load on a surface of the hard metal workpiece, comprising:
reducing the thermomechanical load being exerted on the surface of the hard metal workpiece by the hard cutting tool,
wherein the step of reducing the thermomechanical load comprises one or a combination of at least two of the following:
(a) cooling the hard cutting tool with a first precisely aimed jet or spray of an inert, water-free coolant having an initial temperature in a range of about −250° C. to about +25° C.;
(b) cooling the as-machined surface of the hard metal workpiece with at least one of the first precisely aimed jet or spray and a second precisely aimed jet or spray of the inert, water-free coolant or an other inert, water-free coolant having an initial temperature in a range of about −250° C. to about +25° C.; and
(c) reducing a cutting force component in a direction normal to the as-machined surface of the hard metal workpiece when at least a portion of the thermomechanical load is a component of a cutting force, the component being applied in a direction normal to the surface of the hard metal workpiece.

2. A method as in claim 1, wherein at least one of the first and second jet or spray of the inert, water-free coolant or the other inert, water-free coolant comprises at least one stream containing a cryogenic fluid or at least one ice particle having a temperature less than −75° C.

3. A method as in claim 1, wherein the cutting tool has an inclination angle, and wherein the component of the cutting force is reduced by making the inclination angle more positive.

4. A method as in claim 1, wherein the cutting tool has a rake angle, and wherein the component of the cutting force is reduced by making the rake angle more positive.

5. A method as in claim 1, wherein the hard cutting tool has a hardness and a resistance to cracking, and wherein cooling the hard cutting tool with the first precisely aimed jet or spray of the inert, water-free coolant results in an increase in the hardness or an increase in the resistance to cracking.

6. A method as in claim 1, wherein the hard metal workpiece comprises an iron-containing alloy.

7. A method as in claim 1, wherein the hard cutting tool is made at least in part of a material selected from a group containing a ceramic compound; a ceramic-ceramic composite; a ceramic-metal composite; a diamond-like, metal-free material; an alumina-based ceramic; a cubic boron nitride-based ceramic material; a tungsten carbide-based material; and a cermet-type material.

8. A method for reducing a thickness of a thermomechanically-affected layer, including a white layer (WL) and a dark layer (DL), on and under an as-machined surface of a hard metal workpiece, having an edge hardness exceeding 42 Rockwell on Scale C, being machined by a hard cutting tool, having an edge hardness exceeding 1500 Vickers, the hard cutting tool initially having a first temperature prior to contacting the surface of the hard metal workpiece, the hard cutting tool exerting a thermomechanical load on a surface of the hard metal workpiece, at least a portion of the thermomechanical load being a component of a cutting force, the component being applied in a direction normal to the surface of the hard metal workpiece, comprising the steps of:
cooling the hard cutting tool to a second temperature lower than the first temperature before the hard cutting tool contacts the surface of the hard metal workpiece or while the hard metal workpiece is being machined by the hard cutting tool; and
reducing the component of the cutting force.

9. A method for mitigating a detrimental effect of a thermomechanical load in a machined surface of a hard metal workpiece, having a surface hardness exceeding 42 Rockwell on Scale C, the thermomechanical load being exerted on a surface of the hard metal workpiece by a hard cutting tool, having an edge hardness exceeding 1500 Vicker, the hard cutting tool machining the hard metal workpiece, thereby forming the machined surface, comprising cooling the machined surface by a cooling means having an initial temperature in a range of about −250° C. to about +25° C.

10. A method as in claim 9, wherein the cooling means comprises at least one stream containing a cryogenic fluid or at least one ice particle having a temperature less than −75° C.

11. A method as in claim 9, wherein the cooling means comprises at least one inert, water-free coolant.

12. A method as in claim 9, wherein the hard metal workpiece comprises an iron-containing alloy.

13. A method as in claim 9, wherein the hard cutting tool is made at least in part of a material selected from a group containing a ceramic compound; a ceramic-ceramic composite; a ceramic-metal composite; a diamond-like, metal-free material; an alumina-based ceramic; a cubic boron nitride-based ceramic material; a tungsten carbide-based material; and a cermet-type material.

14. A method for mitigating a detrimental effect of a thermomechanical load in a machined surface of a hard metal workpiece, having a surface hardness exceeding 42 Rockwell on Scale C, the thermomechanical load being exerted on a surface of the hard metal workpiece by a hard cutting tool, having an edge hardness exceeding 1500 Vickers, the hard cutting tool machining the hard metal workpiece, thereby forming the machined surface, wherein at least a portion of the thermomechanical load is a component of a cutting force, the component being applied in a direction normal to the surface of the workpiece, comprising the steps of:
cooling the machined surface by a cooling means having an initial temperature in a range of about −250° C. to about +25° C.; and
reducing the component of the cutting force.

15. A method as claim 14 wherein the hard cutting tool has an inclination angle, and wherein the component of the cutting force is reduced by making the inclination angle more positive and the cooling means comprises at least one stream containing a cryogenic fluid or at least one ice particle having a temperature less than −75° C.

16. A method for mitigating a detrimental effect of a thermomechanical load in a machined surface of a hard metal workpiece, having a surface hardness exceeding 42 Rockwell on Scale C, the thermomechanical load being exerted on a surface of the hard metal workpiece by a hard cutting tool, having an edge hardness exceeding 1500 Vickers, the hard cutting tool machining the hard metal workpiece, thereby forming the machined surface, wherein at least a portion of the thermomechanical load is a component of the cutting force, the component being applied in a direction normal to the surface of the workpiece, comprising the steps of:

cooling the machined surface by a cooling means having an initial temperature in a range of about −250° C. to about +25° C.;
cooling the hard cutting tool simultaneously by the cooling means; and
reducing the component of the cutting force.

17. A method as in claim 16, wherein the hard cutting tool has an inclination angle, and wherein the component of the cutting force is reduced by making the inclination angle more positive and the cooling means comprises at least one stream containing a cryogenic fluid with at least one ice particle having a temperature less than −75° C.

18. A method for machining a hard metal workpiece, having a surface hardness exceeding 42 Rockwell on Scale C, whereby a thickness of a thermomechanically-affected layer, including a white layer (WL) and a dark layer (DL), on an as-machined surface of the hard metal workpiece is reduced, the hard metal workpiece being machined with a hard cutting tool, having an edge hardness exceeding 1500 Vickers, the hard cutting tool initially having a first temperature prior to contacting the surface of the hard metal workpiece, the hard cutting tool exerting a thermomechanical load on a surface of the hard metal workpiece, comprising cooling the hard cutting tool to a second temperature lower than the first temperature before the hard cutting tool contacts the surface of the hard metal workpiece or while the hard metal workpiece is being machined.

19. An after-machined workpiece having been machined by a method for machining a hard metal workpiece, whereby a thickness of a thermomechanically-affected layer on an as-machined surface of the hard metal workpiece is reduced, the hard metal workpiece being machined with a hard cutting tool initially having a first temperature prior to contacting the surface of the hard metal workpiece, the hard cutting tool exerting a thermomechanical load on a surface of the hard metal workpiece, the method comprising cooling the hard cutting tool to a second temperature lower than the first temperature before the hard cutting tool contacts the surface of the hard metal workpiece or while the hard metal workpiece is being machined, the after-machined workpiece comprising:
  an after-machined surface having at least one of a lesser amount of surface residual tensile stress, a greater amount of surface residual compressive stress, a thinner thickness of the thermomechanically-affected layer, and a greater amount of microhardness compared to an other after-machined surface of an other hard metal workpiece machined by dry cutting, the other hard metal workpiece having an other amount of surface residual tensile stress, an other amount of surface residual compressive stress, an other thickness of an other thermomechanically-affected layer, and an other microhardness.

20. A method for machining a hard metal workpiece, whereby a detrimental effect of a thermomechanical load is mitigated in a machined surface of the hard metal workpiece, having a surface hardness exceeding 42 Rockwell on Scale C, the thermomechanical load being exerted on a surface of the hard metal workpiece by a hard cutting tool, having an edge hardness exceeding 1500 Vickers, the hard cutting tool forming the machined surface of the hard metal workpiece, comprising cooling the machined surface by a cooling means having an initial temperature in a range of about −250° C. to about +25° C.

21. An after-machined workpiece having been machined by a method for machining a hard metal workpiece, whereby a detrimental effect of a thermomechanical load is mitigated in a machined surface of the hard metal workpiece, the thermomechanical load being exerted on a surface of the hard metal workpiece by a hard cutting tool forming the machined surface of the hard metal workpiece, the method comprising cooling the machined surface by a cooling means having an initial temperature in a range of about −250° C. to about +25° C., the after-machined workpiece comprising:
  an after-machined surface having at least one of a lesser amount of surface residual tensile stress, a greater amount of surface residual compressive stress, a thinner thickness of the thermomechanically-affected layer, and a greater amount of microhardness compared to an other after-machined surface of an other hard metal workpiece machined by dry cutting, the other hard metal workpiece having an other amount of surface residual tensile stress, an other amount of surface residual compressive stress, an other thickness of an other thermomechanically-affected layer, and an other microhardness.

22. A method for machining a hard metal workpiece, having a surface hardness exceeding 42 Rockwell on Scale C, whereby a thickness of a thermomechanically-affected layer on an as-machined surface of the hard metal workpiece is reduced, the hard metal workpiece being machined with a hard cutting tool, having an edge hardness exceeding 1500 Vickers, the hard cutting tool exerting a thermomechanical load on a surface of the hard metal workpiece, at least a portion of the thermomechanical load being a component of a cutting force, the component being applied in a direction normal to the surface of the hard metal workpiece, comprising reducing the component of the cutting force.

23. An after-machined workpiece having been machined by a method for machining a hard metal workpiece, whereby a thickness of a thermomechanically-affected layer on an as-machined surface of the hard metal workpiece is reduced, the hard metal workpiece being machined with a hard cutting tool, the hard cutting tool exerting a thermomechanical load on a surface of the hard metal workpiece, at least a portion of the thermomechanical load being a component of a cutting force, the component being applied in a direction normal to the surface of the hard metal workpiece, the method comprising reducing the component of the cutting force, the after-machined workpiece comprising:
  an after-machined surface having at least one of a lesser amount of surface residual tensile stress, a greater amount of surface residual compressive stress, a thinner thickness of the thermomechanically-affected layer, and a greater amount of microhardness compared to an other after-machined surface of an other hard metal workpiece machined by dry cutting, the other hard metal workpiece having an other amount of surface residual tensile stress, an other amount of surface residual compressive stress, an other thickness of an other thermomechanically-affected layer, and an other microhardness.

24. A method for machining a hard metal workpiece, having a surface hardness exceeding 42 Rockwell on Scale C, whereby a thickness of a thermomechanically-affected layer, including a white layer (WL) and a dark layer (DL), on an as-machined surface of the hard metal workpiece is reduced, the hard metal workpiece being machined with a hard cutting tool, having an edge hardness exceeding 1500 Vickers, the hard cutting tool initially having a first temperature prior to contacting the surface of the hard metal workpiece, the hard cutting tool exerting a thermomechanical load on a surface of the hard metal workpiece, at least a portion of the thermomechanical load being a component of a cutting force, the component being applied in a direction normal to the surface of the hard metal workpiece, comprising the steps of:

cooling the hard cutting tool to a second temperature lower than the first temperature before the hard cutting tool contacts the surface of the hard metal workpiece or while the hard metal workpiece is being machined; and reducing the component of the cutting force.

25. A method for machining a hard metal workpiece, having a surface hardness exceeding 42 Rockwell on Scale C, whereby a detrimental effect of a thermomechanical load is mitigated in a machined surface of the hard metal workpiece, the thermomechanical load being exerted on a surface of the hard metal workpiece by a hard cutting tool, having an edge hardness exceeding 1500 Vickers, the hard cutting tool forming the machined surface of the hard metal workpiece, comprising the steps of:

cooling the machined surface by a cooling means having an initial temperature in a range of about −250° C. to about +25° C.; and cooling the hard cutting tool simultaneously by the cooling means.

26. A method for machining a hard metal workpiece, having a surface hardness exceeding 42 Rockwell on Scale C, whereby a detrimental effect of a thermomechanical load is mitigated in a machined surface of the hard metal workpiece, the thermomechanical load being exerted on a surface of the hard metal workpiece by a hard cutting tool, having an edge hardness exceeding 1500 Vickers, the hard cutting tool forming the machined surface of the hard metal workpiece, wherein at least a portion of the thermomechanical load is a component of a cutting force, the component being applied in a direction normal to the surface of the workpiece, comprising the steps of:

cooling the machined surface by a cooling means having an initial temperature in a range of about −250° C. to about +25° C.; and reducing the component of the cutting force.

27. An apparatus for reducing a thickness of a thermomechanically-affected layer, including a white layer (WL) and a dark layer (DL), on and under an as-machined surface of a hard metal workpiece, having a surface hardness exceeding 42 Rockwell on Scale C, being machined by a hard cutting tool, having an edge hardness exceeding 1500 Vickers, the hard cutting tool exerting a thermomechanical load on a surface of the hard metal workpiece, comprising:

a means for reducing the thermomechanical load being exerted on the surface of the hard metal workpiece by the hard cutting tool, wherein the means for reducing the thermomechanical load comprises one or a combination of at least two of the following:

(a) a means for cooling the hard cutting tool with a first precisely aimed jet or spray of an inert, water-free coolant having an initial temperature in a range of about −250° C. to about +25° C.;

(b) a means for cooling the as-machined surface of the hard metal workpiece with at least one of the first precisely aimed jet or spray and a second precisely aimed jet or spray of the inert, water-free coolant or an other inert, water-free coolant having an initial temperature in a range of about −250° C. to about +25° C.; and (c) a means (B-O-C of CT) for reducing a cutting force component in a direction normal to the as-machined surface of the hard metal workpiece when at least a portion of the thermomechanical load is a component of a cutting force, the component being applied in a direction normal to the surface of the hard metal workpiece.

28. An apparatus as in claim 27, wherein the hard metal workpiece comprises an iron-containing alloy.

29. An apparatus as in claim 27, wherein the hard cutting tool is made at least in part of a material selected from a group containing a ceramic compound; a ceramic-ceramic composite; a ceramic-metal composite; a diamond-like, metal-free material; an alumina-based ceramic; a cubic boron nitride-based ceramic material; a tungsten carbide-based material; and a cermet-type material.

30. An apparatus for reducing a thickness of a thermomechanically-affected layer on an as-machined surface of a hard metal workpiece having a surface hardness exceeding 42 Rockwell on Scale C, being machined by a hard cutting tool, having an edge hardness exceeding 1500 Vickers, the hard cutting tool initially having a first temperature prior to contacting the surface of the hard metal workpiece, the hard cutting tool exerting a thermomechanical load on a surface of the workpiece, at least a portion of the thermomechanical load being a component of a cutting force, the component being applied in a direction normal to the surface of the hard metal workpiece, comprising:

a means for cooling the hard cutting tool to a second temperature lower than the first temperature before the hard cutting tool contacts the surface of the hard metal workpiece or while the hard metal workpiece is being machined; and a means for reducing the component of the cutting force.

31. An apparatus for mitigating a detrimental effect of a thermomechanical load in a machined surface of a hard metal workpiece, having a surface hardness exceeding 42 Rockwell on Scale C, the thermomechanical load being exerted on a surface of the hard metal workpiece by a hard cutting tool, having an edge hardness exceeding 1500 Vickers, the hard cutting tool machining the hard metal workpiece, thereby forming the machined surface, comprising a means for cooling the machined surface by at least one stream of a coolant having an initial temperature in a range of about −250° C. to about +25° C.

32. An apparatus as in claim 31, wherein the at least one stream contains a cryogenic fluid or at least one ice particle having a temperature less than −75° C.

33. An apparatus as in claim 31, wherein the stream contains at least one inert, water-free coolant.

34. An apparatus for machining a hard metal workpiece, having a surface hardness exceeding 42 Rockwell on Scale C, whereby a thickness of a thermomechanically-affected layer, including a white layer (WL) and a dark layer (DL), on an as-machined surface of the hard metal workpiece is reduced, the hard metal workpiece being machined by a hard cutting tool, having an edge hardness exceeding 1500 Vickers, the hard cutting tool initially having a first temperature prior to contacting the surface of the hard metal workpiece, the hard cutting tool exerting a thermomechanical load on a surface of the hard metal workpiece, comprising a means for cooling the hard cutting tool to a second temperature lower than the first temperature before the hard cutting tool contacts the surface of the hard metal workpiece or while the hard metal workpiece is being machined.

35. An after-machined workpiece having been machined by an apparatus for machining a hard metal workpiece, whereby a thickness of a thermomechanically-affected layer on an as-machined surface of the hard metal workpiece is reduced, the hard metal workpiece being machined by a hard cutting tool initially having a first temperature prior to contacting the surface of the hard metal workpiece, the hard cutting tool exerting a thermomechanical load on a surface of the hard metal workpiece, the apparatus comprising a means for cooling the cutting tool to a second temperature lower than the first temperature before the cutting tool contacts the surface of the hard metal workpiece or while the hard metal workpiece is being machined, the after-machined workpiece comprising:

an after-machined surface having at least one of a lesser amount of surface residual tensile stress, a greater amount of surface residual compressive stress, a thinner thickness of the thermomechanically-affected layer, and a greater amount of microhardness compared to an other after-machined surface of an other hard metal workpiece machined by dry cutting, the other hard metal workpiece having an other amount of surface residual tensile stress, an other amount of surface residual compressive stress, an other thickness of an other thermomechanically-affected layer, and an other microhardness.

36. An after-machined workpiece having been machined by an apparatus for machining a hard metal workpiece, whereby a detrimental effect of a thermomechanical load is mitigated in a machined surface of the hard metal workpiece, the thermomechanical load being exerted on a surface of the hard metal workpiece by a hard cutting tool forming the machined surface of the hard metal workpiece, the apparatus comprising a means for cooling the machined surface by a stream of a fluid having an initial temperature in a range of about −250° C. to about +25° C., the after-machined workpiece comprising:

an after-machined surface having at least one of a lesser amount of surface residual tensile stress, a greater amount of surface residual compressive stress, a thinner thickness of the thermomechanically-affected layer, and a greater amount of microhardness compared to an other after-machined surface of an other hard metal workpiece machined by dry cutting, the other hard metal workpiece having an other amount of surface residual tensile stress, an other amount of surface residual compressive stress, an other thickness of an other thermomechanically-affected layer, and an other microhardness.

37. An apparatus for machining a hard metal workpiece, having a surface hardness exceeding 42 Rockwell on Scale C, whereby a thickness of a thermomechanically-affected layer on an as-machined surface of the hard metal workpiece is reduced, the hard metal workpiece being machined by a hard cutting tool, having an edge hardness exceeding 1500 Vickers, the hard cutting toll exerting a thermomechanical load on a surface of the hard metal workpiece, at least a portion of the thermomechanical load being a component of a cutting force, the component being applied in a direction normal to the surface of the hard metal workpiece, comprising a means for reducing the component of the cutting force.

38. An after-machined workpiece having been machined by an apparatus for machining a hard metal workpiece, whereby a thickness of a thermomechanically-affected layer on an as-machined surface of the hard metal workpiece is reduced, the hard metal workpiece being machined by a hard cutting tool exerting a thermomechanical load on a surface of the hard metal workpiece, at least a portion of the thermomechanical load being a component of a cutting force, the component being applied in a direction normal to the surface of the hard metal workpiece, the apparatus comprising a means for reducing the component of the cutting force, the after-machined workpiece comprising:

an after-machined surface having at least one of a lesser amount of surface residual tensile stress, a greater amount of surface residual compressive stress, a thinner thickness of the thermomechanically-affected layer, and a greater amount of microhardness compared to an other after-machined surface of an other hard metal workpiece machined by dry cutting, the other hard metal workpiece having an other amount of surface residual tensile stress, an other amount of surface residual compressive stress, an other thickness of an other thermomechanically-affected layer, and an other microhardness.

39. An apparatus for machining a hard metal workpiece, having a surface hardness exceeding 42 Rockwell on Scale C, whereby a thickness of a thermomechanically-affected layer, including a white layer (WL) and a dark layer (DL), on an as-machined surface of the hard metal workpiece is reduced, the hard metal workpiece being machined by a hard cutting tool, having an edge hardness exceeding 1500 Vickers, the hard cutting tool initially having a first temperature prior to contacting the surface of the hard metal workpiece, the hard cutting tool exerting a thermomechanical load on a surface of the hard metal workpiece, at least a portion of the thermomechanical load being a component of a cutting force, the component being applied in a direction normal to the surface of the hard metal workpiece, comprising:

a means for cooling the hard cutting tool to a second temperature lower than the first temperature before the hard cutting tool contacts the surface of the hard metal workpiece or while the hard metal workpiece is being machined; and a means for reducing the component of the cutting force.

40. An apparatus for machining a hard metal workpiece, having a surface hardness exceeding 42 Rockwell on Scale C, whereby a detrimental effect of a thermomechanical load is mitigated in a machined surface of the hard metal workpiece, the thermomechanical load being exerted on a surface of the hard metal workpiece by a hard cutting tool, having an edge hardness exceeding 1500 Vickers, the hard cutting tool forming the machined surface of the hard metal workpiece, comprising:

a means for spraying the machined surface with at least one stream of a fluid having an initial temperature in a range of about −250° C. to about +25° C.; and a means for spraying at least one other stream of the fluid simultaneously on the hard cutting tool.

41. An apparatus for machining a hard metal workpiece, having a surface hardness exceeding 42 Rockwell on Scale C, whereby a detrimental effect of a thermomechanical load is mitigated in a machined surface of the hard metal workpiece, the thermomechanical load being exerted on a surface of the hard metal workpiece by a hard cutting tool, having an edge hardness exceeding 1500 Vickers, the hard cutting toll forming the machined surface of the hard metal workpiece, wherein at least a portion of the thermomechanical load is a component of a cutting force, the component being applied in a direction normal to the surface of the hard metal workpiece, comprising:

a means for spraying the machined surface with at least one stream of a fluid having an initial temperature in a range of about −250° C. to about +25° C.; and a means for reducing the component of the cutting force.

42. An apparatus for machining a hard metal workpiece, having a surface hardness exceeding 42 Rockwell on Scale C, whereby a detrimental effect of a thermomechanical load is mitigated in a machined surface of the hard metal workpiece, the thermomechanical load being exerted on a surface of the hard metal workpiece by a hard cutting tool, having an edge hardness exceeding 1500 Vickers, the hard cutting tool forming the machined surface of the hard metal workpiece, wherein at least a portion of the thermomechanical load is a component of a cutting force, the component being applied in a direction normal to the surface of the hard metal workpiece, comprising:

a means for spraying the machined surface with at least one stream of a fluid having an initial temperature in a range of about −250° C. to about +25° C.;

a means for spraying at least one other stream of the fluid simultaneously on the hard cutting tool; and a means for reducing the component of the cutting force.

* * * * *